(12) United States Patent
Zheng et al.

(10) Patent No.: US 12,438,966 B2
(45) Date of Patent: Oct. 7, 2025

(54) CAM ASSEMBLY HAVING AN INTERNAL FRAME AND WEAR RESISTANT

(71) Applicant: HONOR DEVICE CO., LTD., Guangdong (CN)

(72) Inventors: Hansen Zheng, Shenzhen (CN); Handong Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/246,629

(22) PCT Filed: Sep. 14, 2022

(86) PCT No.: PCT/CN2022/118808
§ 371 (c)(1),
(2) Date: Mar. 24, 2023

(87) PCT Pub. No.: WO2023/077969
PCT Pub. Date: May 11, 2023

(65) Prior Publication Data
US 2024/0305704 A1    Sep. 12, 2024

(30) Foreign Application Priority Data
Nov. 8, 2021    (CN) .......................... 202111312105.7

(51) Int. Cl.
*E05D 3/12*    (2006.01)
*F16C 11/04*    (2006.01)
(Continued)

(52) U.S. Cl.
CPC ............. *H04M 1/022* (2013.01); *F16C 11/04* (2013.01)

(58) Field of Classification Search
CPC ....................................................... E05D 3/12
(Continued)

(56) References Cited

U.S. PATENT DOCUMENTS 4,787,944 A * 11/1988 Morita ..................... C21D 9/30
148/903
6,065,187 A * 5/2000 Mischenko ......... H04M 1/0216
16/303

(Continued)

FOREIGN PATENT DOCUMENTS

| CN | 101629599 A | 1/2010 |
|---|---|---|
| CN | 111866236 A | 10/2020 |

(Continued)

*Primary Examiner* — Emily M Morgan
(74) *Attorney, Agent, or Firm* — Fish & Richardson P.C.

(57) ABSTRACT

This application provides a cam assembly, a folding mechanism, terminal device, and a method for manufacturing a cam assembly, and relates to the field of terminals. The cam assembly includes a cam body and a frame. The cam body includes a first cam and a second cam that are oppositely disposed, and a connection body; materials of both the first cam and the second cam include a wear-resistant material; and a first concave portion cooperating with the cam structure is disposed at one end of the cam body. The frame includes a first fastener and a second fastener that are oppositely disposed, and a connector; the first fastener is embedded into the first cam, and the second fastener is embedded into the second cam; extension directions of the first fastener in the first cam include at least the axial direction and the circumferential direction.

12 Claims, 9 Drawing Sheets

(51) Int. Cl.
 *G06F 1/16* (2006.01)
 *H04M 1/02* (2006.01)
(58) Field of Classification Search
 USPC .......................................................... 16/366
 See application file for complete search history.

(56) References Cited

U.S. PATENT DOCUMENTS

| | | | | |
|---|---|---|---|---|
| 6,110,605 | A * | 8/2000 | Taniguchi | C04B 37/026 |
| | | | | 428/627 |
| 6,305,748 | B1 | 10/2001 | Ohba | |
| 7,322,330 | B2 * | 1/2008 | Furchheim | B21D 53/845 |
| | | | | 123/90.6 |
| 7,515,707 | B2 * | 4/2009 | Ka | G06F 1/1683 |
| | | | | 455/575.4 |
| 7,725,989 | B2 | 6/2010 | Huang et al. | |
| 8,615,848 | B2 * | 12/2013 | Mitsui | G06F 1/1681 |
| | | | | 16/354 |
| 8,776,319 | B1 * | 7/2014 | Chang | G06F 1/1681 |
| | | | | 16/303 |
| 9,009,919 | B1 * | 4/2015 | Chiang | G06F 1/1681 |
| | | | | 16/303 |
| 9,261,900 | B2 * | 2/2016 | Hsu | G06F 1/16 |
| 9,290,976 | B1 * | 3/2016 | Horng | G06F 1/1618 |
| 9,624,703 | B1 * | 4/2017 | Lin | E05D 11/087 |
| 10,480,226 | B1 * | 11/2019 | Chen | E05D 3/122 |
| 2006/0112517 | A1 | 6/2006 | Luo et al. | |
| 2009/0000062 | A1 | 1/2009 | Yamanami | |
| 2014/0338482 | A1 | 11/2014 | Hsu et al. | |
| 2016/0034004 | A1 * | 2/2016 | Park | E05D 11/1078 |
| | | | | 16/366 |
| 2022/0217857 | A1 | 7/2022 | Li et al. | |
| 2024/0019910 | A1 * | 1/2024 | Yuan | G06F 1/1681 |

FOREIGN PATENT DOCUMENTS

| | | | | |
|---|---|---|---|---|
| CN | 212838937 U | | 3/2021 | |
| CN | 213458799 U | | 6/2021 | |
| CN | 113194183 A | | 7/2021 | |
| CN | 115037817 A | * | 9/2022 | .............. B21J 5/002 |
| CN | 118669422 A | * | 9/2024 | ............ G09F 9/301 |
| CN | 222513654 U | * | 2/2025 | |
| JP | 2000175759 A | | 6/2000 | |
| JP | 2008089165 A | | 4/2008 | |
| WO | 2011132916 A2 | | 10/2011 | |

* cited by examiner

CAM ASSEMBLY HAVING AN INTERNAL FRAME AND WEAR RESISTANT

CROSS-REFERENCE TO RELATED APPLICATIONS

This application is a National Stage of International Application No. PCT/CN2022/118808 filed on Sep. 14, 2022, which claims priority to Chinese Patent Application No. 202111312105.7, filed on Nov. 8, 2021. The disclosures of the aforementioned applications are hereby incorporated by reference in their entireties.

TECHNICAL FIELD

This application relates to the field of terminal technologies, and in particular to, a cam assembly, a folding mechanism, a terminal device, and a method for manufacturing a cam assembly.

BACKGROUND

With the rapid development of terminal devices such as smartphones, users have an increasingly urgent demand for large-size screens of the smartphones. However, the larger the screen size, the larger the smartphone size. Therefore, to minimize the smartphone size on the basis of the large-size screen, foldable smartphones have emerged. During folding or unfolding the foldable smartphone, a cam, as an extremely important part of the foldable smartphone, inevitably frequently generates relatively friction with other components in the foldable smartphone. Therefore, the cam needs to have high wear resistance.

In the related technology, a cam is made of stainless steel, and a wear-resistant layer is usually disposed on an outer surface of the cam. However, during use, the foldable smartphone needs to be folded or unfolded frequently. Therefore, friction frequently occurs between the cam and the other components. Because the wear-resistant layer is usually small in thickness, when the wear-resistant layer is completely worn, a stainless steel body of the cam is worn gradually, that is, the cam no longer has relatively high wear resistance.

How to ensure that the overall wear resistance of the cam is further increased while meeting a strength requirement of the cam is a technical problem that needs to be resolved urgently at present.

SUMMARY

To resolve the foregoing technical problems, this application provides a cam assembly, a folding mechanism, a terminal device, and a method for manufacturing a cam assembly, which can improve wear resistance of the cam assembly while ensuring relatively high strength of the cam assembly.

This application provides a cam assembly, applied to a folding mechanism. The folding mechanism includes a cam structure. The cam assembly includes a cam body and a frame. The cam body includes a first cam and a second cam that are oppositely disposed, and a connection body located between the first cam and the second cam; materials of the first cam and the second cam include a wear-resistant material; and a first concave portion cooperating with the cam structure is disposed at one end of the cam body. The frame includes a first fastener and a second fastener that are oppositely disposed, and a connector located between the first fastener and the second fastener; the first fastener is embedded into the first cam, and the second fastener is embedded into the second cam; extension directions of the first fastener in the first cam include at least the axial direction and the circumferential direction, and extension directions of the second fastener in the second cam include at least the axial direction and the circumferential direction; and the connector is embedded into the connection body.

The materials of the cam in this application include the wear-resistant material, so that the overall wear resistance of the cam assembly is relatively high. The first fastener is embedded into the first cam, the second fastener is embedded into the second cam, and the extension directions of each of the first fastener and the second fastener include at least the axial direction and the circumferential direction, so that the first fastener and the second fastener can provide relatively good axial and circumferential support for the first cam and the second cam each, thereby improving strength of the first cam and the second cam. The connector is embedded into the connection body, and therefore the connector can provide relatively good support for the connection body, thereby improving the strength of the connection body. In conclusion, the overall strength of the cam assembly can be improved by using the frame in the cam assembly of this application, and the overall wear resistance of the cam assembly can be improved by using the cam containing the wear-resistant material.

In some feasible implementations, the first fastener and the second fastener each include a first fastening body and a second fastening body located on the first fastening body, the first fastening body extends in the circumferential direction, and the second fastening body extends in the axial direction. Therefore, the first fastening bodies can bear a radial force, that is, can provide radial support for the first cam and the second cam. The second fastening bodies can bear an axial force, that is, can provide axial support for the first cam and the second cam. The connector can bear a transverse force between the first cam and the second cam, that is, can provide transverse support for the cam body.

In some feasible implementations, there are a plurality of first concave portions, and a convex portion is formed between every two first concave portions; and there are a plurality of second fastening bodies, the second fastening bodies are in a one-to-one correspondence with the convex portions, and a part of the second fastening body is located in the convex portion. When the cam assembly is applied to a terminal device, the first concave portion interacts with the cam structure. Therefore, when there are a plurality of first concave portions, the plurality of concave portions can jointly bear a force exerted by the cam structure. In addition, when the second fastening bodies are in a one-to-one correspondence with the convex portions, and a part of the second fastening body is located in the convex portion, each second fastening body can provide support for the convex portion, and therefore the strength of the cam assembly can be further improved.

In some feasible implementations, the first fastening body includes a plurality of fastening portions arranged in a preset shape, and one second fastening body is fastened between every two fastening portions. The preset shape may include a circle, square, or the like. In this way, the fastener may be formed by welding the plurality of fastening portions and second fastening bodies.

In some feasible implementations, the first fastening body is of an integrally formed structure. In this way, the first fastening body may be obtained by bending a steel plate or round steel, so that strength of the first fastening body is relatively high, and therefore the strength of the cam assembly can be improved.

In some feasible implementations, end faces of the first fastening body are closed. Because the structure with the closed shape has higher strength, the strength of the first fastening body can be further improved by using such structure, and therefore the strength of the cam assembly can be improved.

In some feasible implementations, the second fastening body includes a first fastening column and a second fastening column that are respectively fastened on two sides of the first fastening body. In this way, the center of the first fastening column and the center of the second fastening column may coincide with the center of the first fastening body. When the first fastening column bears a force, the force can be transferred to the first fastening body and the second fastening column, and therefore the first fastening body can provide support well.

In some feasible implementations, the second fastening body is of an integrated structure. In this way, the second fastening body may be obtained by cutting a steel plate or round steel, which can improve the strength of the second fastening body, and therefore the strength of the cam assembly can be improved.

In some feasible implementations, the second fastening body is fastened on the outer side or inner side of the first fastening body. In this way, both the first fastening body and the second fastening body can be of an integrated structure, and therefore the strength of the entire cam assembly can be improved.

In some feasible implementations, a shape of a first section captured along a first cutting plane of the first fastening body includes a circle or a polygon, and the first cutting plane is perpendicular to the circumferential direction. In this way, the first fastening body can be manufactured by using steel with the existing section shape, that is, material can be easily obtained.

In some feasible implementations, the shape of the first section includes a rectangle, and long sides of the first section extend in the axial direction. When the cam assembly is applied to a terminal device, the first concave portion bears a force exerted by the cam structure. Because a first abutting surface of the first concave portion is usually an inclined plane having an obtuse angle with an end face of the first cam, an included angle between the force and the end face of the first cam is an obtuse angle, and the force can be decomposed into a force in the axial direction of the first cam (namely, axial force) and a force in the radial direction of the first cam (namely, radial force). When long sides of a cross-section of the first fastening body extend in the axial direction of the first cam, the extension direction of the long sides of the first fastening body is the same as the direction of the axial force, and therefore the first fastening body can provide better axial support for the first cam. Similarly, the first fastening body can also provide better axial support for the second cam.

In some feasible implementations, a shape of a second section captured along a second cutting plane of the second fastening body includes a circle or a polygon, and the second cutting plane is perpendicular to the axial direction. In this way, the second fastening body can be manufactured by using steel with the existing section shape, that is, materials can be easily obtained.

In some feasible implementations, the shape of the second section includes a rectangle, and long sides of the second section extend in the radial direction of the first cam or the second cam. When the cam assembly is applied to a terminal device and bears a force exerted by the cam structure, the extension direction of long sides of a cross-section of the second fastening body is the same as the direction of the radial force formed by decomposition of the force, and therefore the second fastening body can provide better radial support for the first cam and the second cam.

In some feasible implementations, materials of the connection body include a wear-resistant material. In this way, the materials of the connection body, the first cam, and the second cam are the same, so that the connection body, the first cam, and the second cam can be manufactured in an integral forming manner, which can avoid the situation that welds are generated between the connection body, the first cam and the second cam when manufacturing a cam body, and therefore cracks appear at the welds when the cam body bears a force.

In some feasible implementations, materials of both the first cam and the second cam include a ceramic particle reinforced aluminum matrix composite. Because the ceramic particle reinforced aluminum matrix composite has relative high wear resistance, the first cam and the second cam have relative high wear resistance.

In some feasible implementations, materials of the frame include stainless steel. Stainless steel is high strength steel, and therefore the strength of the frame can be improved, thereby improving the strength of the cam assembly.

This application further provides a folding mechanism, including a cam assembly according to any of the foregoing implementations, and a cam structure cooperating with the cam assembly. The folding mechanism can achieve all effects of the foregoing cam assembly.

In some feasible implementations, the cam structure and the cam assembly are arranged in the axial direction. A second concave portion is disposed at the end that is of the cam structure and that faces the cam assembly. The second concave portion is configured to abut on the first concave portion of the cam assembly, so that when the cam structure rotates around an own axis, the cam assembly moves in the axial direction. When the cam assembly of this application is applied to a terminal device, the cam assembly always has relatively high wear resistance, so that there will be no large amount of wear, and therefore the folding mechanism can provide relatively stable damping. When the terminal device is folded or unfolded to an angle, the folding angle will not be increased or decreased due to an accidental touch of a user, and therefore user experience can be improved.

In some feasible implementations, the folding mechanism further includes a spring and a rotating shaft. The cam structure is fastened on the outer surface of the rotating shaft. The cam assembly is slidably connected to the outer surface of the rotating shaft. The spring is sleeved on the rotating shaft and is located on a side that is of the cam assembly and that is away from the cam structure, the end that is of the spring and that is away from the cam assembly remains in the same position relative to the rotating shaft, the other end of the spring abuts on the cam, and the spring is compressed when the cam assembly moves. In this way, when the cam structure rotates, a force can be exerted on the first concave portion by the second concave portion, and the cam assembly moves towards the spring and compresses the spring while bearing the force. When the cam structure stops rotating, the force exerted on the cam assembly by the cam structure can be balanced with an elastic force of the spring, and therefore the implementation process of such structure is relatively simple.

This application further provides a terminal device, including a folding mechanism according to any of the foregoing implementations. The terminal device can achieve all effects of the folding mechanism.

This application further provides a method for manufacturing a cam assembly, used to manufacture the cam assembly according to any of the foregoing implementations. The manufacturing method includes: manufacturing a frame; placing the frame into a prefabricated mold; pouring a solution containing a wear-resistant material into the mold, and cooling to obtain a semifinished part of the cam assembly; performing die forging on the semifinished part of the cam assembly, to obtain a die forged cam assembly; performing heat treatment on the die forged cam assembly, to obtain a cam assembly after heat treatment; and surfacing the cam assembly after heat treatment, to obtain the cam assembly.

The frame is placed into the prefabricated mold at first, and then the solution containing the wear-resistant material is poured into the mold, so that a cam body and the frame are tightly attached, and therefore the strength of connection between the cam body and the frame can be improved. Die forging is performed on the semifinished part of the cam assembly, which can improve density of the cam assembly, and thus improve wear resistance of the cam assembly. Heat treatment is performed on the die forged cam assembly, which can improve comprehensive mechanical properties of the cam assembly. Surfacing is performed on the cam assembly after heat treatment, which can improve size accuracy and surface smoothness of the cam assembly.

BRIEF DESCRIPTION OF DRAWINGS

To describe the technical solutions in embodiments of this application more clearly, the following briefly describes the accompanying drawings required for describing the embodiments of this application. Apparently, the accompanying drawings in the following descriptions merely show some embodiments of this application, and a person of ordinary skill in the art may still derive others drawings from these accompanying drawings without creative efforts.

Figure 1A:
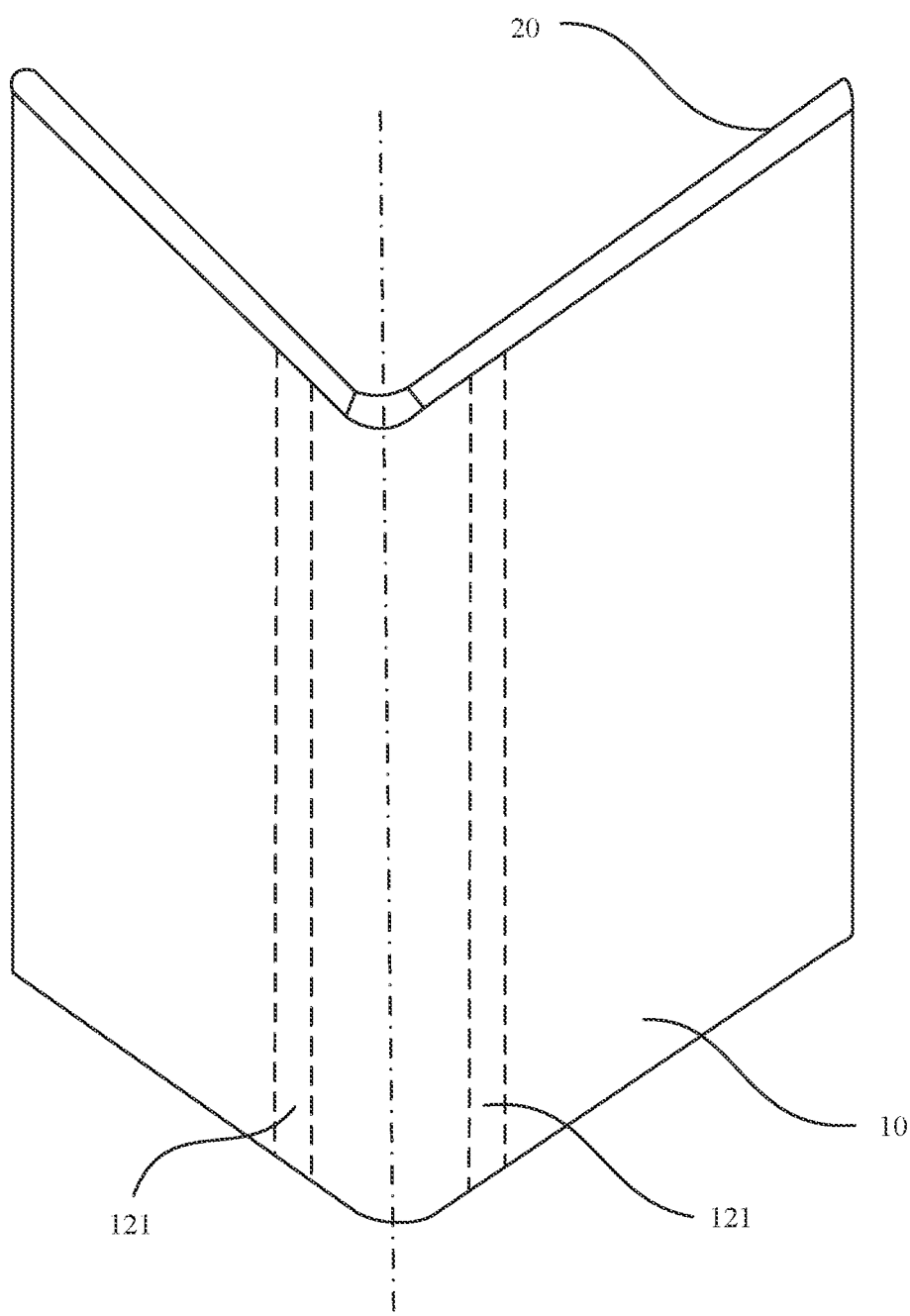
FIG. 1a is a schematic diagram of a structure of a foldable smartphone in a semi-folded state according to an embodiment of this application.

Reference numerals: 10—Folding assembly; 20—Flexible screen; 11—Housing; 12—Folding mechanism; 121—Rotating shaft; 124—Spring; 122—First cam structure; 1221—First cam portion; 1222—Second cam portion; 1223—First connection portion; 1224—First end face; 1225—First concave portion; 1226—First side surface; 1227—Second side surface; 123—Second cam structure; 1231—Third cam portion; 1232—Second connection portion; 1233—Second end face; 1234—Second concave portion; 1235—Third side surface; 1236—Fourth side surface; 125—Third cam structure; 1251—Cam end face; 30—Cam assembly; 31—Cam body; 311—Cam; 3111—Third end face; 3112—Fourth end face; 3113—Third concave portion; 3114—Annular hole position; 3115—Longitudinal through hole; 3116—Abutting surface; 312—Connection body; 3121—Fifth end face; 3122—Sixth end face; 3123—Transverse through hole; 32—Frame; 321—Fastener; 3211—arc-Shaped fastening body; 3212—First fastening column; 3213—Second fastening column; 3214—Fastening ring; 3215—Third fastening column; 3216—Joint; 322—Connector.

DESCRIPTION OF EMBODIMENTS

The following clearly describes the technical solutions in embodiments of this application with reference to the accompanying drawings in embodiments of this application. Apparently, the described embodiments are merely some rather than all of embodiments of this application. Based on the embodiments of this application, all other embodiments obtained by a person of ordinary skill in the art without creative efforts fall within the protection scope of this application.

The term "and/or" in this specification describes only an association relationship for describing associated objects and represents that three relationships can exist. For example, "A and/or B" can represent the following three cases: Only A exists, both A and B exist, and only B exists.

In the specification and claims of this application, the terms "first", "second", "third", "fourth", and the like are intended to distinguish between different objects but do not indicate a particular order of the objects. For example, a first target object and a second target object are used to distinguish between different target objects, and are not used to describe a specific order of the target objects.

In embodiments of this application, the word such as "as an example" or "for example" is used to represent giving an example, an illustration, or a description. In embodiments of this application, any embodiment or design solution described as "as an example" or "for example" shall not be explained as being preferred or advantageous over other embodiments or design solutions. To be precise, the use of the words such as "as an example" or "for example" is intended to present a related concept in a specific manner.

In the descriptions of the embodiments of this application, unless otherwise specified, "a plurality of" means two or more. For example, a plurality of processing units mean two or more processing units, and a plurality of systems mean two or more systems.

Embodiments of this application provide a cam assembly and a folding mechanism. The cam assembly and the folding mechanism can be applied to a foldable smartphone. In addition, the cam assembly and the folding mechanism can also be applied to a terminal device with a folding function, such as a foldable tablet computer, a foldable game console, a foldable personal digital assistant (personal digital assistant, PDA), which is not limited in the embodiments of this application.

Figure 1B:
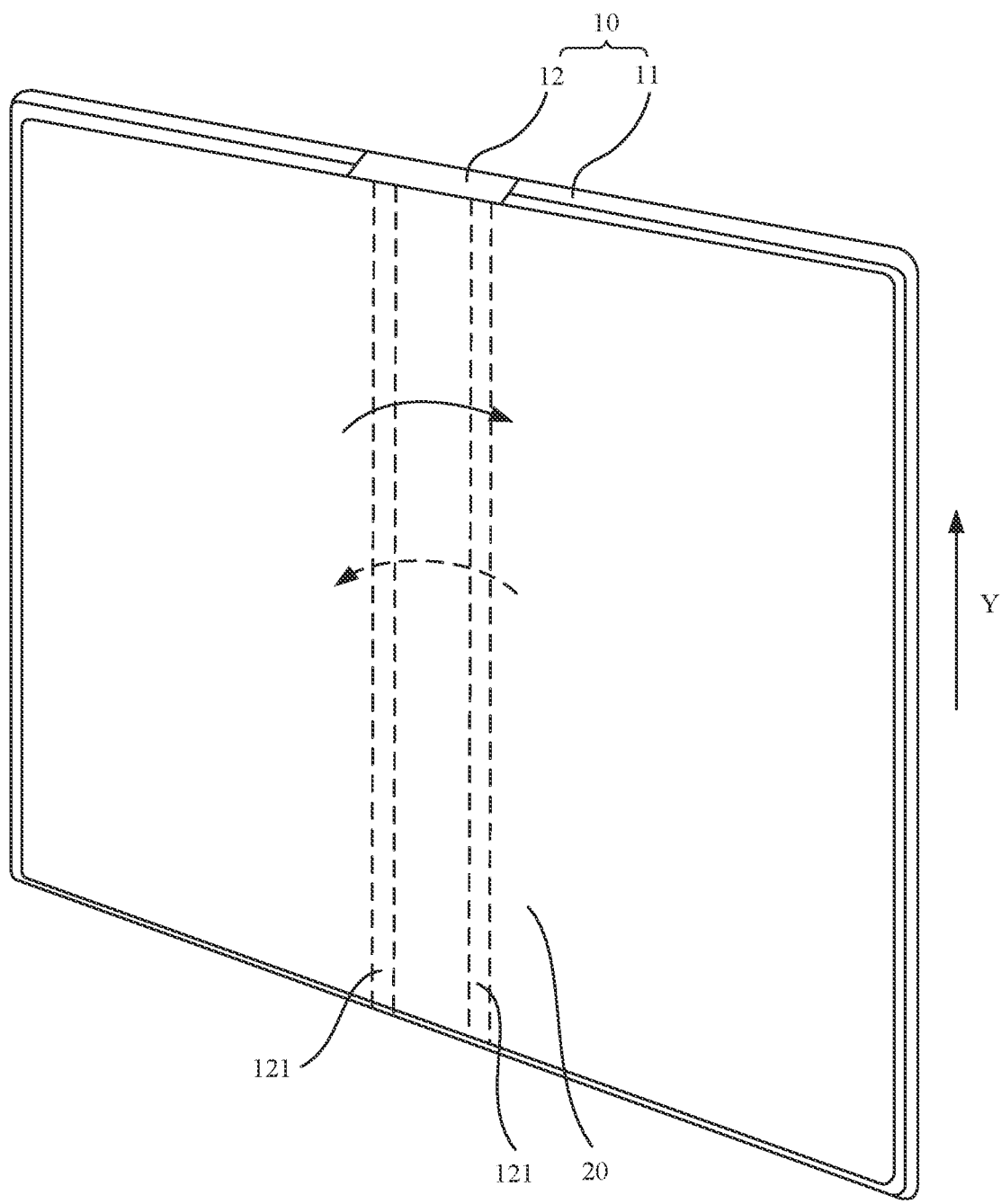
FIG. 1b is a schematic diagram of a structure of a foldable smartphone in an unfolded state according to an embodiment of this application.

FIG. 1a is a schematic diagram of a structure of a foldable smartphone in a semi-folded state according to an embodiment of this application. FIG. 1b is a schematic diagram of a structure of a foldable smartphone in an unfolded state according to an embodiment of this application. As shown in FIG. 1a and FIG. 1b, the foldable smartphone includes at least a folding assembly 10 and a flexible screen 20 fastened to one surface of the folding assembly 10. The folding assembly 10 can be folded or unfolded to drive folding or unfolding of the flexible screen 20. The foldable smartphone may be an inward foldable mobile phone, that is, the flexible screen 20 is located on the inner side of the folding assembly 10. The foldable smartphone may also be an outward foldable mobile phone, that is, the flexible screen 20 is located on the outer side of the folding assembly 10. If the foldable smartphone is an inward foldable mobile phone, when a folding angle of the folding assembly 10 is 0, the flexible screen 20 is completely wrapped in the folding assembly 10, which can not only reduce the size of the phone, but also protect the flexible screen 20. When the folding assembly 10 is completely unfolded, that is, the angle of the folding assembly 10 is 180 degrees, the flexible screen 20 is in a flattened state and also in a state with maximum display area, and the user can operate on the flexible screen 20.

As shown in FIG. 1b, the folding assembly 10 includes a housing 11 and a folding mechanism 12 connected to the housing 11. There may be one folding mechanism 12, and the folding mechanism 12 is in a middle position in the Y direction. In other embodiments, there may alternatively be two, three, or more folding mechanisms 12. When there are a plurality of folding mechanisms 12, the plurality of folding mechanisms 12 are evenly arranged in the Y direction.

Figure 2:
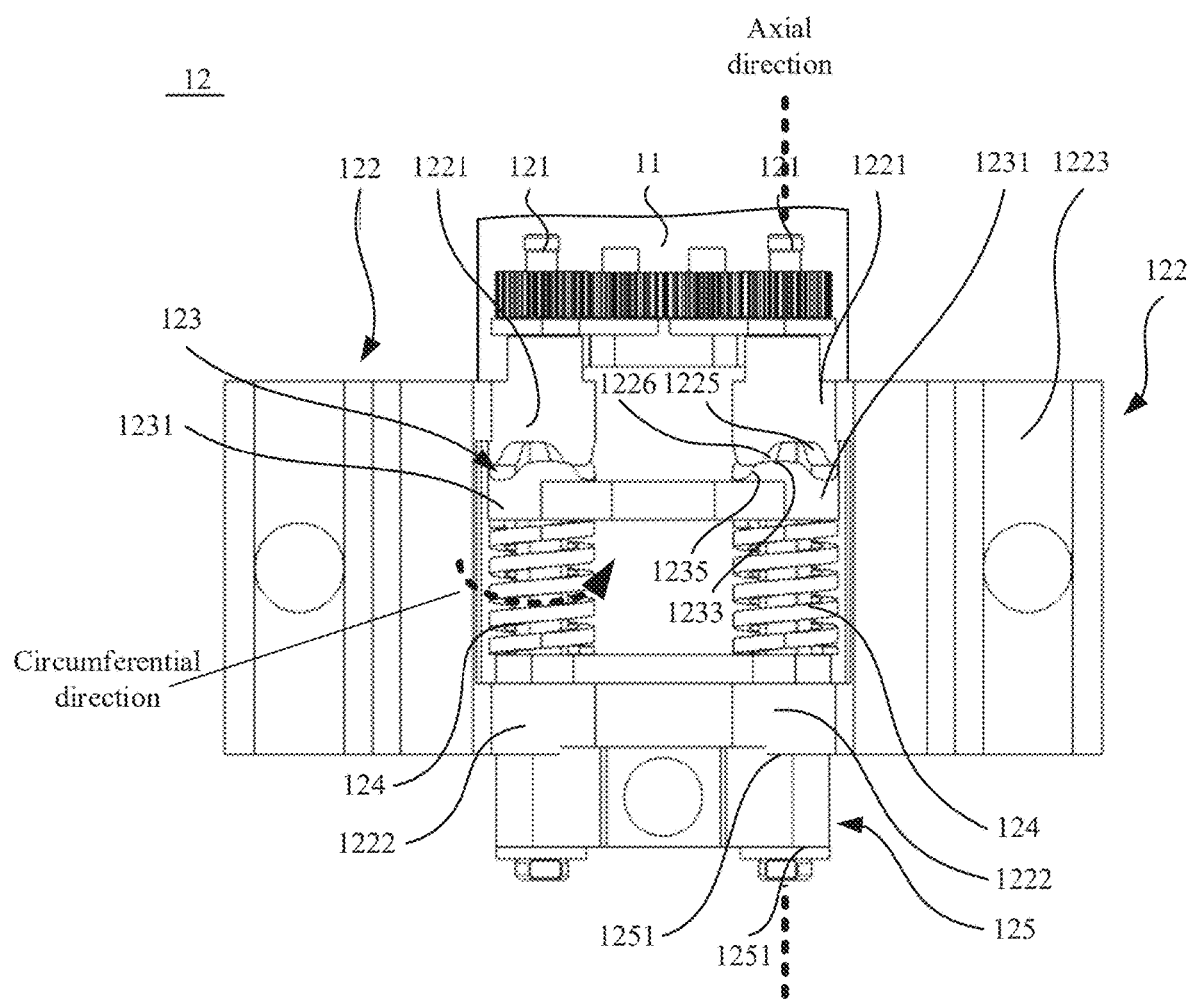
FIG. 2 is a schematic diagram of a structure of a folding mechanism according to an embodiment of this application.

As shown in FIG. 2, the folding mechanism 12 includes two rotating shafts 121, two first cam structures 122, a second cam structure 123, a third cam structure 125, and two springs 124. The two rotating shafts 121 are rotatably connected to the housing 11, and the two rotating shafts 121 are disposed in the Y direction and parallel to each other. For the positions of the rotating shafts 121 on the foldable smartphone, refer to FIG. 1a and FIG. 1b.

It should be noted that the quantities of the first cam structure 122, second cam structure 123, third cam structure 125 and spring 124 shown in FIG. 2 are only used as an example and do not constitute a limitation on the technical solutions of the embodiments of this application. If the quantity of the first cam structures 122 is M, the quantity of the second cam structures 123 and the quantity of the third cam structures 125 are both N, and the quantity of the springs 124 is P, M and P are equal and are both twice of N. In other embodiments of this application, both M and P are 4, and N is 2; or both M and P are 6, and N is 3 or the like.

As shown in FIG. 2, the two first cam structures 122 are respectively connected to the two rotating shafts 121. For example, one first cam structure 122 is connected to one rotating shaft 121, the other first cam structure 122 is connected to the other rotating shaft 121, and connection positions of the two first cam structures 122 on the rotating shafts 121 correspond to each other.

Figure 3:
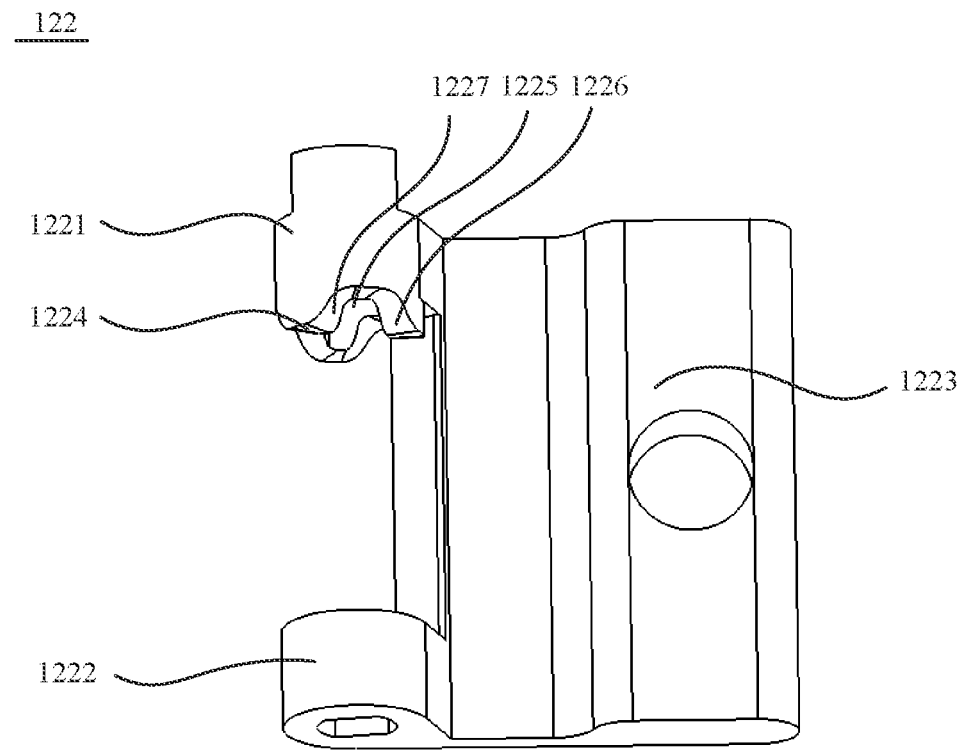
FIG. 3 is a schematic diagram of a structure of a first cam structure of the folding mechanism shown in FIG. 2.

As shown in FIG. 3, the first cam structure 122 includes a first cam portion 1221, a second cam portion 1222, and a first connection portion 1223, where the first connection portion 1223 is connected between the first cam portion 1221 and the second cam portion 1222. As shown in FIG. 2, connection positions of the first cam portions 1221 of the two first cam structures 122 on the rotating shafts 121 correspond to each other, and connection positions of the second cam portions 1222 of the two first cam structures 122 on the rotating shafts 121 also correspond to each other.

Still referring to FIG. 2, the first cam portion 1221 is fastened to the outer surface of the rotating shaft 121, and the first cam portion 1221 can rotate with rotation of the rotating shaft 121. The first cam portion 1221 is of a hollow structure with openings at two ends. As shown in FIG. 3, a first concave portion 1225 is formed on a first end face 1224 of the first cam portion 1221. There may be three first concave portions 1225, and the three first concave portions 1225 are evenly arranged along the circumference of the first cam portion 1221. In other embodiments of this application, there may be one, two, four, or more first concave portions 1225, which is not limited in the embodiments of this application.

As shown in FIG. 3, the first concave portion 1225 is provided with a first side surface 1226 and a second side surface 1227 opposite to the first side surface 1226, and both the first side surface 1226 and the second side surface 1227 are inclined planes. The first concave portion 1225 has a small bottom and a large top.

As shown in FIG. 2, the second cam portion 1222 is fastened to the outer surface of the rotating shaft 121, and the second cam portion 1222 and the first cam portion 1221 are arranged in the axial direction of the rotating shaft 121. The structure of the second cam portion 1222 may be different from the structure of the first cam portion 1221, specifically, two end faces of the second cam portion 1222 are planes.

Figure 4:
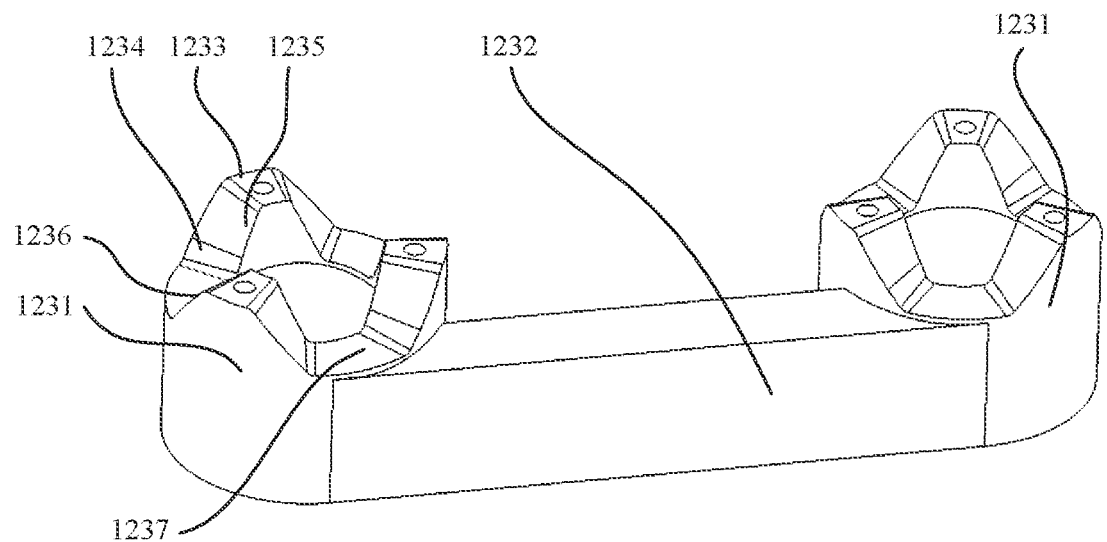
FIG. 4 is a schematic diagram of a structure of a second cam structure of the folding mechanism shown in FIG. 2.

As shown in FIG. 4, the second cam structure 123 includes two third cam portions 1231 and a second connection portion 1232 connected between the two third cam portions 1231. As shown in FIG. 2, the two third cam portions 1231 are respectively sleeved at corresponding positions of the two rotating shafts 121, and the two third cam portions 1231 can slide in the axial direction of the rotating shafts 121. One third cam portion 1231 of the two third cam portions 1231 is sleeved on one rotating shaft 121, and the other third cam portion 1231 is sleeved on the other rotating shaft 121.

As shown in FIG. 4, the third cam portion 1231 is of a hollow structure with openings at two ends, the third cam portion 1231 is provided with a second end face 1233, and three second concave portions 1234 are formed on the second end face 1233. As shown in FIG. 2, the second end face 1233 faces the first concave portion 1225. In other embodiments of this application, there may be one, two, four, or more second concave portions 1234, which is not limited in the embodiments of this application.

As shown in FIG. 4, the second concave portion 1234 is provided with a third side surface 1235 and a fourth side surface 1236 opposite to the third side surface 1235, both the third side surface 1235 and the fourth side surface 1236 are inclined planes, and the second concave portion 1234 is in a shape with a small bottom and a large top. As shown in FIG. 2, the third side surface 1235 fits the first side surface 1226, and abuts on the same. That the third side surface 1235 fits the first side surface 1226 may mean that the third side surface 1235 and the first side surface 1226 have the same surface shape, for example, both the third side surface 1235 and the first side surface 1226 are planes, or both the third side surface 1235 and the first side surface 1226 are curved surfaces. Because the first cam portion 1221 can rotate with an axis of the rotating shaft 121 as a center, and the third cam portion 1231 can move in the axial direction of the rotating shaft 121, when both the third side surface 1235 and the first side surface 1226 are curved surfaces, the first cam portion 1221 can be rotated to any position, and the third side surface 1235 abuts on the first side surface 1226 as much as possible.

As shown in FIG. 2, two cam end faces 1251 of the third cam structure 125 are planes.

As shown in FIG. 2, one spring 124 of the two springs 124 is sleeved on one rotating shaft 121 and located at an end that is of the second cam structure 123 and that is away from the first cam portion 1221, and the other spring 124 is sleeved on the other rotating shaft 121 and located at an end that is of the other second cam structure 123 and that is away from the second cam portion 1222. A first end of each spring 124 of the two springs 124 is in contact with the third cam portion 1231, and a second end of the same is fastened to the rotating shaft 121.

As shown in FIG. 2, when an included angle between the two opposite first cam structures 122 is 0, the folding angle of the foldable smartphone is 0, and the third cam portion 1231 is in contact with the first end of the spring 124. When a force is exerted on the folding assembly 10 to make the two first cam structures 122 to rotate with the rotating shaft 121, the first side surface 1226 of the first cam portion 1221 generates an extrusion force on the third side surface 1235 of the third cam portion 1231. Because the second cam structure 123 can slide in the axial direction of the rotating shaft 121, the second cam structure 123 generates displacement under the action of the extrusion force, that is, moves towards a direction away from the first concave portion 1225 on which the second cam structure abuts, to extrude the spring 124. The spring 124 under pressure generates compressive deformation, to exert an elastic force on the second cam structure 123. During the process of folding the foldable smartphone, the second cam structure 123 bears two forces all the time: one is the extrusion force exerted by the first cam structure 122, and the other is the elastic force exerted by the spring 124, the two forces have opposite directions, and therefore balance can be achieved. After the foldable smartphone is folded to an angle and stops, the two forces that achieve balance can ensure that the foldable smartphone stops at this angle, that is, the folding mechanism 12 can provide a damping force, to keep the foldable smartphone at this angle.

It should be noted that, in this embodiment, a damping effect of the folding mechanism 12 can be achieved through interaction between the first cam portion 1221 and the second cam structure 123. To enable the folding mechanism 12 to have a better damping effect, in other embodiments, the structure of the second cam portion 1222 may be the same as the structure of the first cam portion 1221, and correspondingly, the third cam structure 125 is also the same as the second cam structure 123.

Specifically, the second cam portion 1222 is also provided with a first concave portion 1225. The disposing direction of the first concave portion 1225 on the second cam portion 1222 is the same as the disposing direction of the first concave portion 1225 on the first cam portion 1221, that is, the first concave portion 1225 on the first cam portion 1221 is disposed in a direction towards the second cam portion 1222, and the first concave portion 1225 on the second cam portion 1222 is disposed in a direction away from the first cam portion 1221.

The third cam structure 125 is also provided with a second concave portion 1234, and the second concave portion 1234 faces the second cam portion 1222. The second concave portion 1234 of the third cam structure 125 also abuts on the first concave portion 1225 of the second cam portion 1222.

As shown in FIG. 2, further, the first connection portion 1223 connects the first cam portion 1221 and the second cam portion 1222. In this way, the first cam portion 1221 and the second cam portion 1222 will rotate synchronously.

It also should be noted that, in other embodiments of this application, the first cam structure 122 may alternatively include only the first cam portion 1221, but does not include the second cam portion 1222. In this solution, the folding mechanism 12 includes two first cam structures 122, one second cam structure 123, and two springs 124.

In an embodiment of this application, the second cam structure 123 is made of stainless steel. It can be understood that the stainless steel is a non-wear-resistant material, that is, when friction acts on the stainless steel, an amount of wear of the stainless steel is greater than that of the wear-resistant material. To improve wear resistance of the second cam structure 123, a wear-resistant layer is usually disposed on the outer surface of the second cam structure 123. However, in a use process, the foldable smartphone needs to be folded or unfolded frequently. Therefore, friction frequently occurs between the second cam structure 123 and the first cam structure 122. Because the thickness of the wear-resistant layer is usually small, after the wear-resistant layer is completely worn, a stainless steel body of the second cam structure 123 will be gradually worn by a greater amount, a damping force provided by the folding mechanism 12 is gradually reduced, and when the user folds or unfolds the foldable smartphone to an angle, the folding angle may be increased or decreased due to an accidental touch, which affects user experience.

Figure 5:
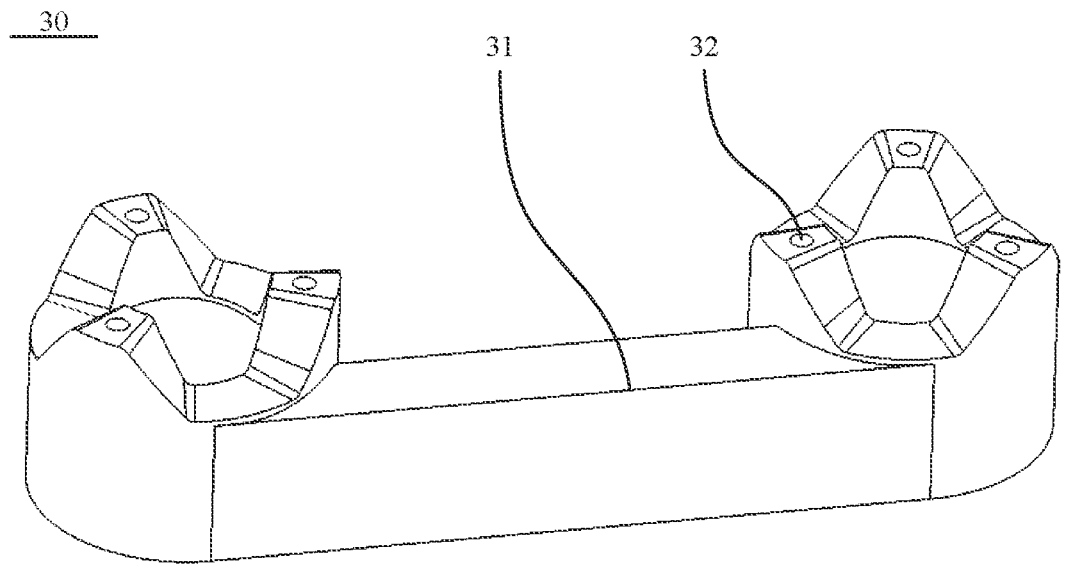
FIG. 5 is a schematic diagram of a structure of a cam assembly according to another embodiment of this application.
Figure 6:
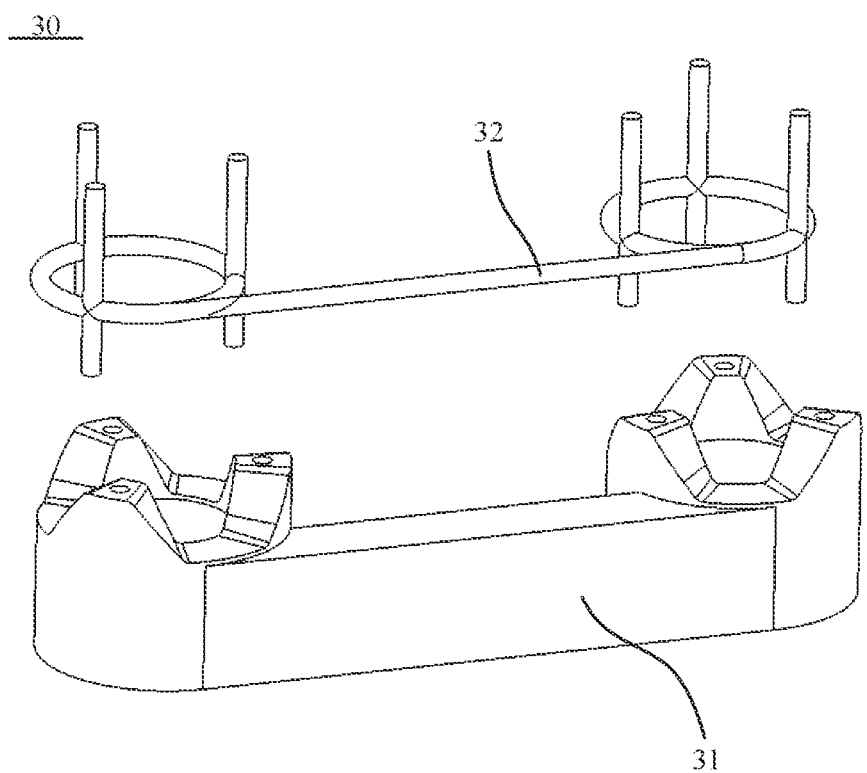
FIG. 6 is an exploded view of the cam assembly shown in FIG. 5.

Based on this, as shown in FIG. 5 and FIG. 6, another embodiment of this application provides a cam assembly 30, and the appearance of the cam assembly 30 may be the same as the appearance of the foregoing second cam structure 123. In this embodiment, the cam assembly 30 includes a cam body 31 and a frame 32 embedded into the cam body 31.

Figure 7A:
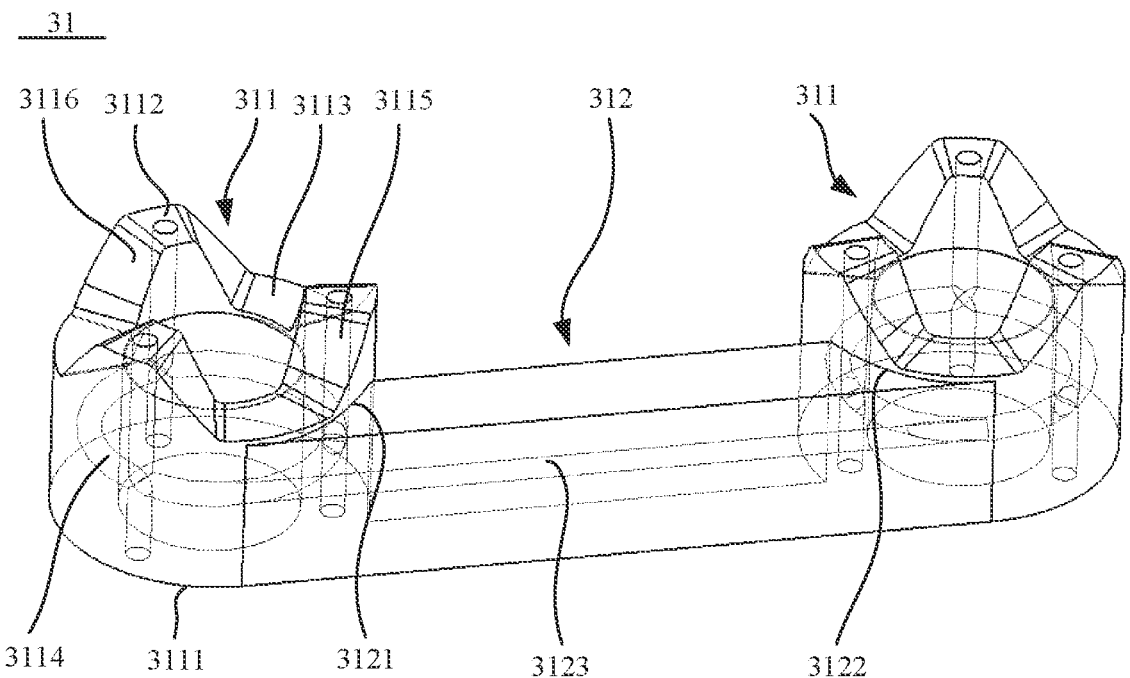
FIG. 7a is a perspective view of a cam body in the cam assembly shown in FIG. 5.

As shown in FIG. 7a, the cam body 31 includes two cams 311 and a connection body 312, where the two cams 311 are oppositely disposed, and the connection body 312 is located between the two cams 311.

As shown in FIG. 7a, the cam 311 is of a hollow structure with openings at two ends. The cam 311 is provided with a third end face 3111 and a fourth end face 3112 that are opposite to each other, the third end face 3111 is a plane and is flush with the connection body 312, and the fourth end face 3112 is higher than the connection body 312. Three third concave portions 3113 are formed on the fourth end face 3112, and the third concave portion 3113 is in a shape with a small bottom and a big top. One side surface of the third concave portion 3113 is an abutting surface 3116 configured to interact with the first cam structure 122.

It should be noted that, in other embodiments of this application, there may be one, two, four, or more third concave portions 3113 on each cam 311, which is not limited in the embodiments of this application.

As shown in FIG. 7a, an annular hole position 3114 is provided in the cam 311 and in the circumferential direction of the cam 311, and three longitudinal through holes 3115 penetrating from the third end face 3111 to the fourth end face 3112 are provided in the cam 311. A center line of the annular hole position 3114 intersects with a center line of each longitudinal through hole 3115, and the hole diameter of the annular hole position 3114 is the same as the hole diameter of each longitudinal through hole 3115.

In other embodiments of this application, a positional relationship between the annular hole position 3114 and the longitudinal through hole 3115 may be as follows: A center line of the annular hole position 3114 does not intersect with a center line of the longitudinal through hole 3115, but the annular hole position 3114 overlaps the longitudinal through hole 3115; or the annular hole position 3114 does not overlap the longitudinal through hole 3115, and the two communicate with each other by using a hole position provided additionally.

As shown in FIG. 7a, the two cams 311 are of a symmetrical structure about the center of the connection body 312. Specifically, the cams 311 have the same distance from the center of the connection body 312, the quantities of the third concave portions 3113 on the cams 311 may be the same, and the disposing positions of the third concave portions are symmetrical about the center of the connection body 312. In this way, after the cam assembly 30 is applied to the folding mechanism 12, in the process of folding or unfolding the foldable smartphone, forces exerted by the first cam structure 122, on two cam bodies of the cam assembly 30 through the third side surface 1235 are also symmetrical about the center of the connection body 312, so that the cam assembly 30 can be prevented from bearing an offset load force as much as possible, thereby avoiding the situation that the cam assembly 30 is prone to damage due to the offset load force. The entire cam body 31 can also be of a symmetrical structure about the center of the connection body 312.

The material of the cam 311 is a wear-resistant material. It can be understood that the wear-resistant material usually has relative high wear resistance, so that when the cam 311 is made of the wear-resistance material, the entire cam 311 has relatively high wear resistance, that is, when the same magnitude of friction acts on the cam, the amount of wear of the cam 311 is smaller than that of other cams made of non-wear-resistant materials. In this way, after frequent and long-term friction, even if the surface is worn, the cam still has relatively high wear resistance, and does not lose a wear-resistant effect due to wear of the surface. Therefore, when the cam assembly 30 according to this embodiment of this application is applied to a foldable smartphone, because the cam always keeps relatively high wear resistance, and does not have the relatively large amount of wear, the service life of the cam assembly 30 can be prolonged. In addition, the folding mechanism 12 can further provide relatively stable damping. After the foldable smartphone is folded or unfolded to an angle, the folding angle is not increased or decreased due to accidental touch of the user, so that user experience can be improved.

The wear-resistant material may be a ceramic particle reinforced aluminum matrix composite, which is isotropic. The ceramic particle reinforced aluminum matrix composite includes matrix alloy and reinforcement particles, the matrix alloy may be aluminum alloy with relatively high strength, such as 2 series (Al—Cu series) aluminum alloy, 6 series (Al—Mg—Si series) aluminum alloy, or 7 series (Al—Zn—Mg—Cu series) aluminum alloy. The reinforcement particles may be ceramic particles with relatively high rigidity, such as $SiC$, $Al_2O_3$, $TiC$, or $TiB_2$. The volume fraction of the reinforcement particles is 10%-45%, and the size of the reinforcement particles is 10-50 μm. The density of the ceramic particle reinforced aluminum matrix composite can be greater than 99%. In this way, the wear-resistant material has relatively high wear resistance and moderate strength. In addition, the density of the wear-resistant material is small, which further reduces the weight.

As shown in FIG. 7a, in this embodiment of this application, the cross-section of the connection body 312 is a rectangle. In other embodiments of this application, the cross-section of the connection body 312 may be a square, circle, or the like. It should be noted that, in this embodiment, the connection body 312 is a long strip, and the length direction of the connection body is an extension direction from one cam 311 to another cam 311, a cutting plane perpendicular to the length direction of the connection body 312 can be defined, and thus the cross-section of the connection body 312 refers to a surface captured along the cutting plane.

As shown in FIG. 7a, two end faces of the connection body 312 fit the outer surfaces of the cams 311. For example, when the outer surface of the cam 311 is a cylindrical surface, the end face that is of the connection body 312 and that is connected to the cam 311 is also an arc surface having the same diameter as the cylindrical surface. In this way, it is convenient for processing the cam assembly 30 by using a casting processing method, or when a welding processing method is used, a stress generated at the joint of the connection body 312 and the cam 311 can be reduced, so that the strength of the cam assembly 30 can be improved, and cracks or even fractures generated when the cam assembly bears a force can be reduced.

As shown in FIG. 7a, the connection body 312 is provided with a fifth end face 3121 connected to one cam 311, and a sixth end face 3122 connected to the other cam 311. The connection body 312 is provided with a transverse through hole 3123 penetrating from the fifth end face 3121 to the sixth end face 3122, and both ends of the transverse through hole 3123 communicate with the annular hole position 3114.

As shown in FIG. 7a, in this embodiment of this application, the transverse through hole 3123 is a circular hole, and the hole diameter of the transverse through hole 3123 is the same as the hole diameter of the annular hole position 3114. In other embodiments of this application, the hole diameter of the transverse through hole 3123 is different from the hole diameter of the annular hole position 3114.

In this embodiment of this application, the material of the connection body 312 may also be the wear-resistant material. In this way, the cam 311 and the connection body 312 are of the same material, and thus the entire cam body 31 can be manufactured in an integral forming manner. In addition, the density of the wear-resistant material is small, which further reduces the weight.

In other embodiments of this application, the connection body 312 may alternatively be made of other materials with high strength, such as stainless steel or Q345B. The cam body 31 may be manufactured in a split forming manner. For example, the two cams 311 and the connection body 312 can be separately manufactured, and then welds are formed at the joints between the two cams 311 and the connection body 312, that is, the cam body 31 is manufactured by using a welding method.

Figure 8:
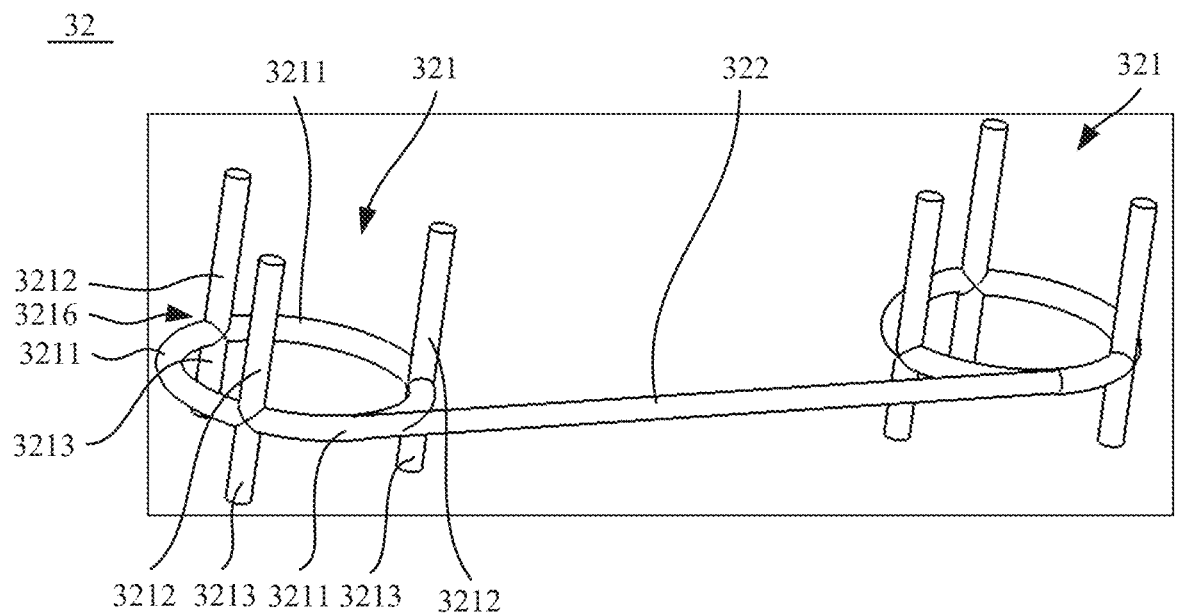
FIG. 8 is a schematic diagram of a structure of a frame of the cam assembly shown in FIG. 5 according to an embodiment.

In this embodiment of this application, as shown in FIG. 8, the frame 32 includes two fasteners 321 and a connector 322, where the connector 322 is fastened between the two fasteners 321. Because the cam body 31 is of a symmetrical structure about the center of the connection body 312, correspondingly, the frame 32 is also of a symmetrical structure about the center of the connector 322.

As shown in FIG. 8, the fastener 321 includes three arc-shaped fastening bodies 3211, three first fastening columns 3212, and three second fastening columns 3213. The three arc-shaped fastening bodies 3211 are arranged in a circle, and every two arc-shaped fastening bodies 3211 are connected to each other. One first fastening column 3212 and one second fastening column 3213 are fastened at the joint of every two arc-shaped fastening bodies 3211, and the first fastening column 3212 and the second fastening column 3213 are respectively fastened on two side surfaces of the arc-shaped fastening body 3211. In some cases, a fastening body comprising the three arc-shaped fastening bodies 3211 is also referred to as the "first fastening body," and a fastening body comprising one first fastening column 3212 and one second fastening column 3213 is also referred to as the "second fastening body."

Figure 7B:
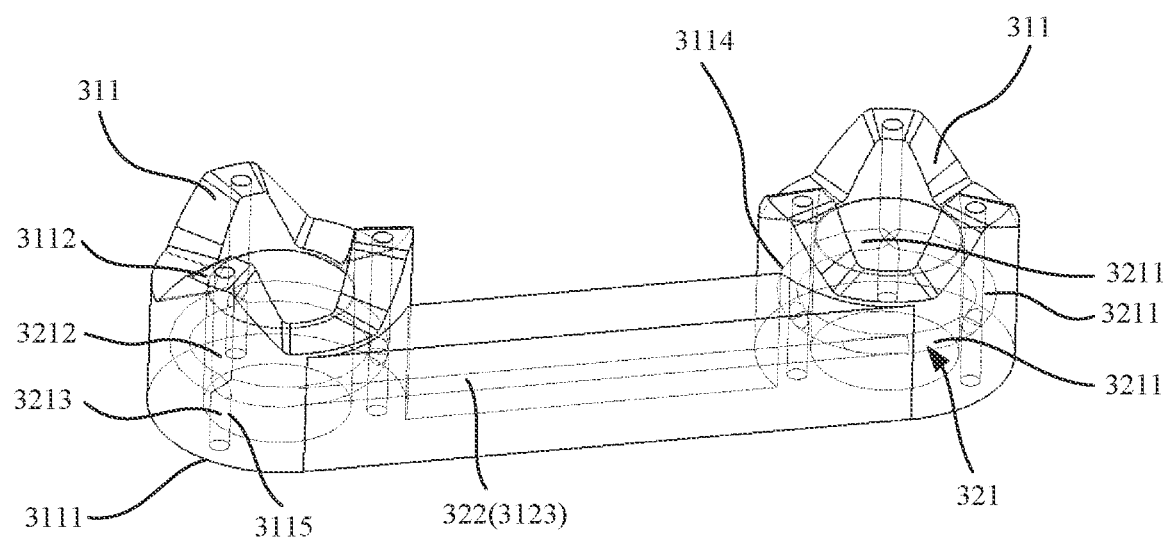
FIG. 7 is an exploded view of the cam assembly shown in FIG. 5.

As shown in FIG. 7b, the three arc-shaped fastening bodies 3211 of the fastener 321 are all fastened in the annular hole position 3114 of the cam 311, and the arc-shaped fastening bodies 3211 fit the annular hole position 3114. For example, the shape of the outer surface of the arc-shaped fastening body 3211 is the same as the shape of the annular hole position 3114, and the size of the outer surface of the arc-shaped fastening body 3211 is the same as or similar to the size of the inner surface of the annular hole position 3114. For example, when the annular hole position 3114 is a circular hole, the cross-section of the arc-shaped fastening body 3211 is also a circle.

It should be noted that three directions can be defined: the axial direction of the cam 311, the circumferential direction of the cam 311 and the radial direction of the cam 311. Therefore, the cross-section of the arc-shaped fastening body 3211 is a plane captured along a cutting plane perpendicular to the circumferential direction of the cam 311.

As shown in FIG. 7b, both the first fastening column 3212 and the second fastening column 3213 are fastened in the longitudinal through hole 3115, an end face of the first fastening column 3212 is flush with the fourth end face 3112 of the cam 311, and an end face of the second fastening column 3213 is flush with the third end face 3111 of the cam 311. In this way, the fastener 321 penetrates from the third end face 3111 to the fourth end face 3112 of the cam 311, which can provide better support for the cam body 31, to further improve the strength of the cam body 31, and to reduce the occurrence of fractures of the cam body 31 when the cam body bears an extrusion force.

Still referring to FIG. 8, each joint 3216 includes two arc-shaped fastening bodies 3211: a first fastening column 3212 and a second fastening column 3213. To ensure reliable connections between the arc-shaped fastening bodies 3211, the first fastening column 3212, and the second fastening column 3213, two symmetrical notches can be provided in each of the arc-shaped fastening bodies 3211, the first fastening column 3212, and the second fastening column 3213, so that a sharp corner and two slopes are formed at one end of each of the arc-shaped fastening bodies 3211, the first fastening column 3212, and the second fastening column 3213. Therefore, each component can be in close contact with the slopes of the adjacent components, and then welding is performed for fastening, which can reduce a welding stress, thereby improving the strength of connection parts, and then improving the strength of the entire frame 32.

As shown in FIG. 7b, the connector 322 is fastened in the transverse through hole 3123, and the outer surface of the connector 322 fits the inner surface of the transverse through hole 3123. The connector 322 may be a connection column, and the cross-section of the connection column is a circle. It should be noted that the cross-section of the connection column is a plane captured along a cutting plane perpendicular to the axial direction of the cam.

The frame 32 may also be made of another material with high strength, such as stainless steel or Q345B. Because a wear-resistant material usually has low strength, the frame 32 made of a high-strength material can be embedded into the cam body 31 made of the wear-resistant material, which can improve the strength of the cam assembly 30, that is, the wear resistance of the cam assembly 30 is improved while relatively high strength of the cam assembly 30 is ensured.

It should be noted that the connection body 312 in this embodiment and the connector 322 fastened in the connection body can constitute a second connection portion 1232 shown in FIG. 4. The cam 311, the arc-shaped fastening bodies 3211 fastened in the cam, and the first fastening columns 3212 and the second fastening columns 3213 fastened in the longitudinal through holes 3115 can constitute a third cam portion 1231 shown in FIG. 4.

In another embodiment of this application, a difference from the embodiment shown in FIG. 8 lies in the different structure of the fastener 321 of the frame 32. Specifically, in this embodiment, the three arc-shaped fastening bodies 3211 in the embodiment shown in FIG. 8 are replaced by a fastening ring 3214. The fastener 321 includes a fastening ring 3214, three first fastening columns 3212, and three second fastening columns 3213, and the three first fastening columns 3212 and the three second fastening columns 3213 are respectively fastened on two sides of the fastening ring 3214. End faces of the fastening ring 3214 are closed, and the fastening ring 3214 may be of an integrally formed structure, for example, the fastening ring 3214 can be formed with round steel.

Figure 9:
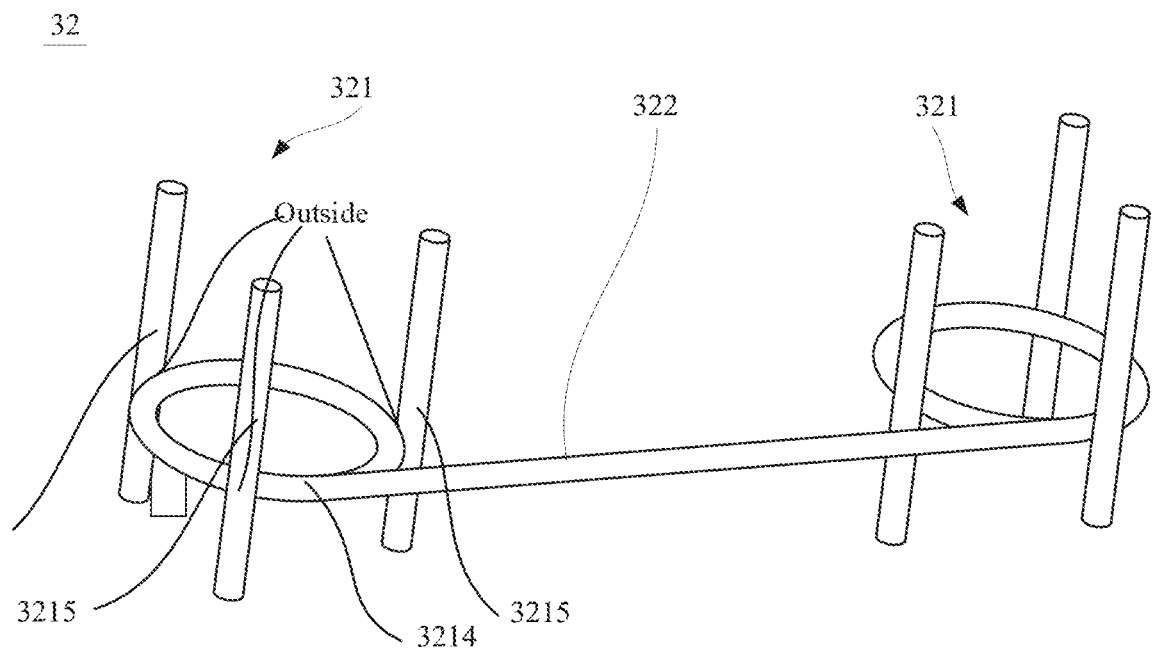
FIG. 9 is a schematic diagram of a structure of a frame according to another embodiment of this application.

In another embodiment of this application, a difference from the embodiment shown in FIG. 8 lies in the different structure of the fastener 321 of the frame 32. Specifically, as shown in FIG. 9, in this embodiment, the three arc-shaped fastening bodies 3211 in the embodiment shown in FIG. 8 is replaced by a fastening ring 3214, and the first fastening columns 3212 and the second fastening columns 3213 in the embodiment shown in FIG. 8 are replaced by third fastening columns 3215. In this embodiment, the fastener 321 includes a fastening ring 3214 and three third fastening columns 3215, the three third fastening columns 3215 are all fastened on the outer side of the fastening ring 3214, and two ends of the three third fastening columns 3215 extend out of the fastening ring 3214. The third fastening column 3215 is of an integrated structure, for example, the third fastening column 3215 can be obtained by cutting round steel.

Figure 10:
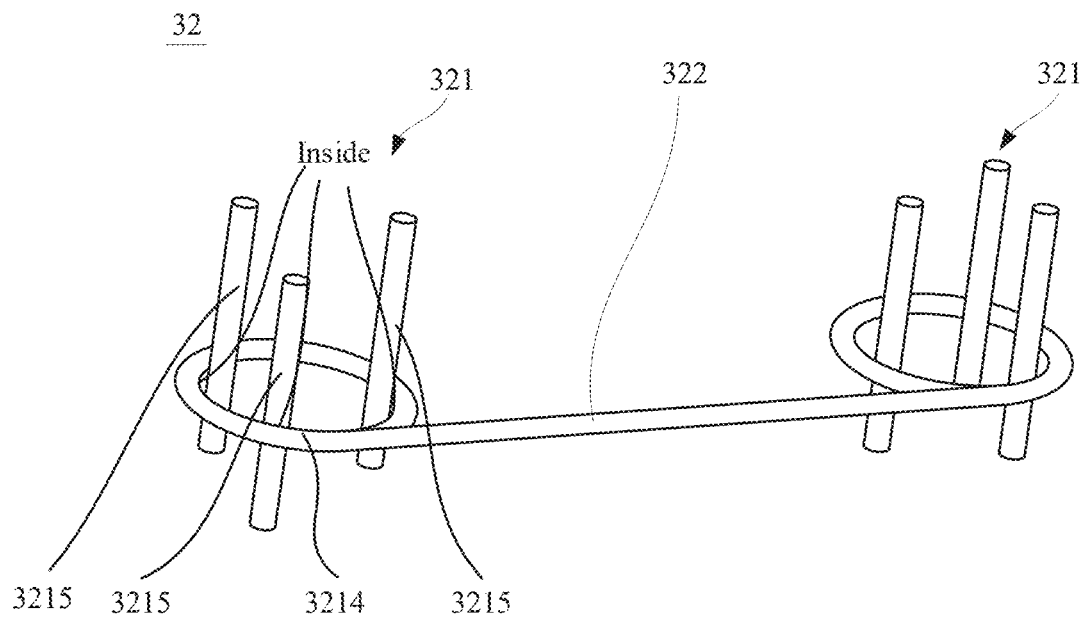
FIG. 10 is a schematic diagram of a structure of a frame according to in yet another embodiment of this application.

In another embodiment of this application, a difference from the embodiment shown in FIG. 9 lies in different fastening positions of the third fastening columns 3215 on the fastening ring 3214. Specifically, as shown in FIG. 10, in this embodiment, the three third fastening columns 3215 are all fastened on the inner side of the fastening ring 3214.

In another embodiment of this application, a difference from the embodiment shown in FIG. 8 lies in the different structure of the fastener 321 of the frame 32. Specifically, in this embodiment, the first fastening columns 3212 and the second fastening columns 3213 in the embodiment shown in FIG. 8 are replaced by third fastening columns 3215. In this embodiment, the fastener 321 includes three arc-shaped fastening bodies 3211 and three third fastening columns 3215 arranged in a circle, one third fastening column 3215 are connected between every two arc-shaped fastening bodies 3211, and both two ends of the three third fastening columns 3215 extend out of the arc-shaped fastening body 3211.

In another embodiment of this application, a difference from the embodiment shown in FIG. 9 lies in the cross-section shapes of the fastener 321 and the connector 322 in the frame 32. The cross-sections of both the fastener 321 and the connector 322 in the embodiment shown in FIG. 9 are circles, and in this embodiment, the cross-sections of both the fastener 321 and the connector 322 in this embodiment are rectangles.

Figure 11:
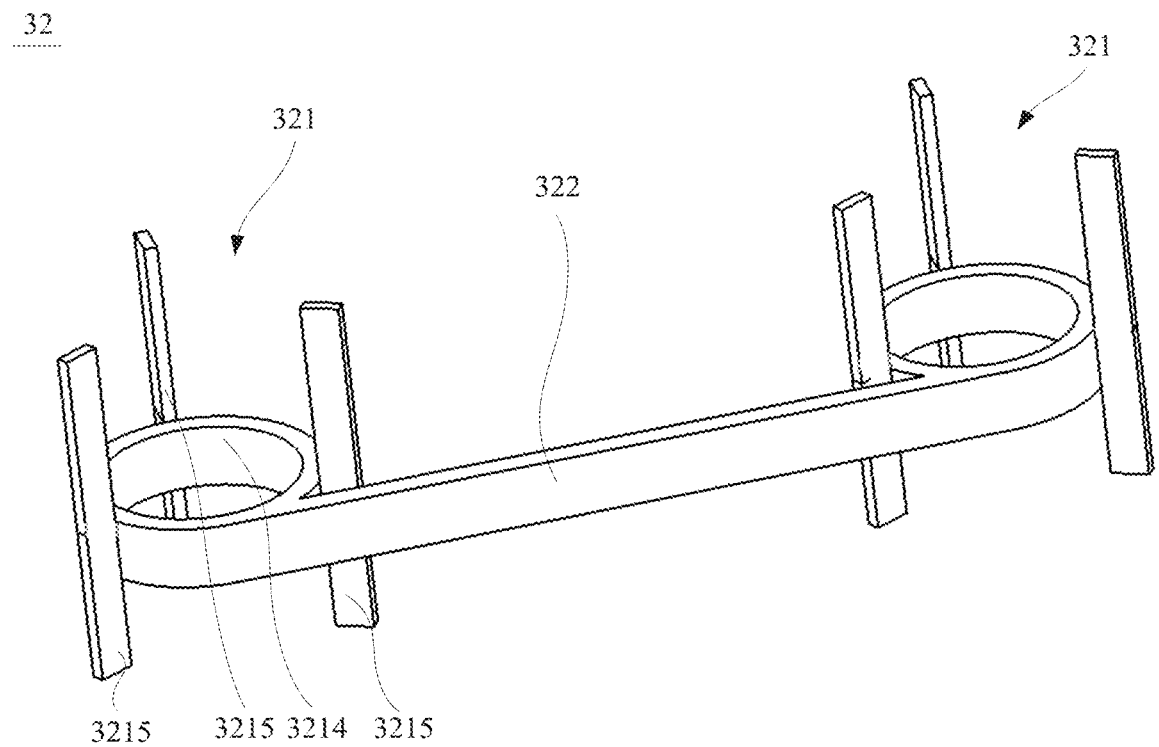
FIG. 11 is a schematic diagram of a structure of a frame according to in yet another embodiment of this application.

Specifically, as shown in FIG. 11, the fastener 321 includes a fastening ring 3214 and three third fastening columns 3215, and the three third fastening columns 3215 are all fastened on the outer side of the fastening ring 3214.

As shown in FIG. 11, the cross-section of the fastening ring 3214 is a rectangle, and the fastening ring 3214 is of an integrally formed structure. Therefore, the fastening ring 3214 can be obtained by bending a steel plate. When the cross-section of the fastening ring 3214 is a rectangle, long sides of the rectangular cross-section are disposed in the axial direction of the cam. It should be noted that the cross-section of the fastening ring 3214 is a plane captured along a cutting plane perpendicular to the circumferential direction of the cam.

As shown in FIG. 11, when the cross-section of the third fastening column 3215 is a rectangle, long sides of the rectangular cross-section of the third fastening column 3215 are disposed in the radial direction of the cam, and therefore the strength of the cam assembly 30 can be further improved.

As shown in FIG. 11, when the cross-section of the connector 322 is a rectangle, long sides of the rectangular cross-section of the connector 322 are disposed in the axial direction of the cam.

In other embodiments of this application, the cross-section of the fastening ring 3214 or the third fastening column 3215 may also be a triangle, pentagon, or another polygon.

Figure 12:
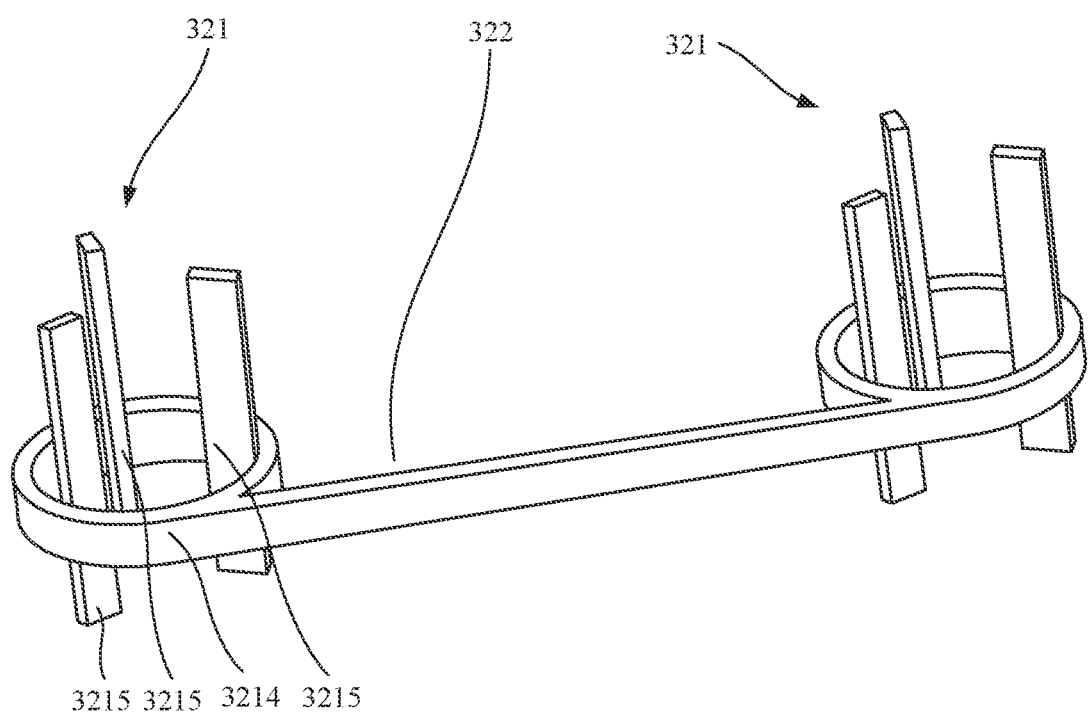
FIG. 12 is a schematic diagram of a structure of a frame according to yet another embodiment of this application.

In another embodiment of this application, a difference from the embodiment shown in FIG. 11 lies in different fastening positions of the third fastening columns 3215 on the fastening ring 3214. Specifically, as shown in FIG. 12, the three third fastening columns 3215 are all fastened on the inner side of the fastening ring 3214.

In other embodiments of this application, in the three fastening columns 3215, some of the fastening columns 3215 can be fastened on the inner side of the fastening ring 3214, and the remaining third fastening columns 3215 are fastened on the outer side of the fastening ring 3214, which is not limited in the embodiments of this application.

A method for processing a cam assembly 30 of the embodiments of this application is described below:

When the material of an entire cam body 31 is a wear-resistant material, the entire cam assembly 30 can be manufactured by using an insert casting method, specifically including:

Step 1: Manufacture a frame 32.

Manufacture three arc-shaped fastening bodies 3211, a connector 322, three first fastening columns 3212 and three second fastening columns 3213, and weld the three arc-shaped fastening bodies 3211, the connector 322, the three first fastening columns 3212 and the three second fastening columns 3213 to form the frame 32.

Step 2: Manufacture a semifinished part of the cam assembly.

Put the frame 32 into a prepared mold, and pour a prepared solution of a wear-resistant material into the metal mold. After cooling and solidification, the frame 32 is closely embedded into a metal cast, and then the semifinished part of the cam assembly is obtained.

It should be noted that, in this embodiment of this application, in the process of preparing the cam body 31 of the cam assembly 30, any of different types of ceramic particles may be used, and forming modes used for the semifinished part of the cam assembly may be varied when the different types of ceramic particles and the ceramic particles with different volume fractions are used. For example, when the volume fraction of the particles is relatively low (10%-20%), the semifinished part of the cam assembly can be prepared by using a particle adding and stirring method (the ceramic particles are SiC, $Al_2O_3$, and the like.) or an in-situ synthesis method (the ceramic particles are TiC, $TiB_2$, $Al_2O_3$, and the like.); or when the volume fraction of the particles is moderate (20%-40%), the semifinished part of the cam assembly can be prepared by using a powder metallurgic method; or when the volume fraction of the particles is relatively high (40%-45%), the semifinished part of the cam assembly can be prepared by using an infiltration method.

Step 3: Perform die forging and heat treatment on the semifinished part of the cam assembly.

Perform die forging on the semifinished part of the cam assembly to improve the density of the semifinished part to more than 99%, and then perform heat treatment on the semifinished part to obtain a cam assembly after heat treatment.

Step 4: Manufacture a finished product of the cam assembly.

Perform surface finishing on the cam assembly after heat treatment, to obtain a formed part with the size and surface quality meeting requirements.

The embodiments of this application are described with reference to the accompanying drawings. However, this application is not limited to the foregoing specific implementations. The foregoing specific implementations are merely examples, but are not limiting. Persons of ordinary skill in the art may make many forms without departing from the object and the scope of the claims of this application and are within the protection scope of this application.

What is claimed is:

1. A cam assembly, comprising a cam body and a frame, wherein:
the cam body comprises a first cam and a second cam that are oppositely disposed, and a connection body located between the first cam and the second cam, materials of both the first cam and the second cam comprise a ceramic particle reinforced aluminum matrix composite, both the first and second cam have a plurality of alternating concave portions and convex portions; and
the frame comprises a first fastener and a second fastener that are oppositely disposed, and a connector located between the first fastener and the second fastener, the first fastener is embedded into the first cam, the second fastener is embedded into the second cam, extension directions of the first fastener in the first cam comprise at least an axial direction and a circumferential direction, extension directions of the second fastener in the second cam comprise at least the axial direction and the circumferential direction, and the connector is embedded into the connection body, wherein the first fastener and the second fastener each comprise a plurality of first fastening bodies and a plurality of second fastening bodies located on the first fastening body, the first fastening bodies extend in the circumferential direction located in the concave portions of the cam body, and the second fastening bodies extend in the axial direction located in the convex portions of the cam body.

2. The cam assembly according to claim 1, wherein the plurality of fastening portions are arranged in a preset shape, and one second fastening body is located between fastening portions.

3. The cam assembly according to claim 1, wherein the first fastening body is of an integrally formed structure.

4. The cam assembly according to claim 1, wherein the second fastening body comprises a first fastening column and a second fastening column that are respectively fastened on two sides of the first fastening body.

5. The cam assembly according to claim 1, wherein the second fastening body is of an integrally formed structure.

6. The cam assembly according to claim 1, wherein the second fastening body is fastened on an inner side or outer side of the first fastening body.

7. The cam assembly according to claim 1, wherein a cross-sectional shape of the first fastening bodies comprises a circle or polygon.

8. The cam assembly according to claim 7, wherein the cross-sectional shape of the first fastening bodies is a rectangle.

9. The cam assembly according to claim 1, wherein a cross-sectional shape of the second fastening bodies comprises a circle or polygon.

10. The cam assembly according to claim 9, wherein the cross-sectional shape of the second fastening bodies comprises a rectangle.

11. The cam assembly according to claim 1, wherein the material of the connection body is the same as the first and second cams.

12. The cam assembly according to claim 1, wherein materials of the frame comprise stainless steel.

* * * * *

UNITED STATES PATENT AND TRADEMARK OFFICE
CERTIFICATE OF CORRECTION

| | | |
|---|---|---|
| PATENT NO. | : 12,438,966 B2 | Page 1 of 1 |
| APPLICATION NO. | : 18/246629 | |
| DATED | : October 7, 2025 | |
| INVENTOR(S) | : Hansen Zheng and Handong Zhang | |

It is certified that error appears in the above-identified patent and that said Letters Patent is hereby corrected as shown below:

On the Title Page

In Column 1 (Item (54) Title), In Line 2, Delete "RESISTANT" and insert -- RESISTANT MATERIAL --.

In the Specification

In Column 1, In Line 2, Delete "RESISTANT" and insert -- RESISTANT MATERIAL --.

Signed and Sealed this
Thirteenth Day of January, 2026

John A. Squires
*Director of the United States Patent and Trademark Office*